United States Patent [19]
Dutton et al.

[11] Patent Number: 5,999,476
[45] Date of Patent: Dec. 7, 1999

[54] BIOS MEMORY AND MULTIMEDIA DATA STORAGE COMBINATION

[75] Inventors: Drew Jon Dutton; Dale E. Gulick; Michael T. Wisor, all of Austin, Tex.

[73] Assignee: Advanced Micro Devices, Inc., Sunnyvale, Calif.

[21] Appl. No.: 08/976,303

[22] Filed: Nov. 21, 1997

[51] Int. Cl.[6] ....................................................... G11C 8/00
[52] U.S. Cl. .......................... 365/230.01; 365/52; 365/63; 395/652
[58] Field of Search .................................. 395/281, 200.1, 395/652; 365/230.01, 173, 52, 63, 185.33, 230.05

[56] References Cited

U.S. PATENT DOCUMENTS

| | | | |
|---|---|---|---|
| 5,608,876 | 3/1997 | Cohen et al. | 395/281 |
| 5,737,524 | 4/1998 | Cohen et al. | 395/200.01 |
| 5,819,087 | 10/1998 | Le et al. | 395/652 |

*Primary Examiner*—David Nelms
*Assistant Examiner*—Thong Le
*Attorney, Agent, or Firm*—Skjerven, Morrill, MacPherson, Franklin & Friel, L.L.P.; William W. Holloway

[57] ABSTRACT

A shared interface to a non-volatile memory including a first storage area for BIOS and a second storage area (e.g., for multimedia data) provides an integrated configuration which saves the cost and space of duplicating memory elements to support multiple data and program types in personal computers. The BIOS information is shadowed from the non-volatile memory to a second memory (e.g., a PC main memory). Thereafter, the BIOS information is accessed in the second memory and the information of the second storage area is accessed via the shared interface. The storage may be integrated upon personal computer system boards without a degradation in performance or an increase in pin count of the board memory because the same pins are used at different times for different memory portions. Accordingly, a storage system is provided to meet the demands of increasing storage requirements without a corresponding increase in cost, space or performance.

23 Claims, 2 Drawing Sheets

BIOS MEMORY AND MULTIMEDIA DATA STORAGE COMBINATION

BACKGROUND

1. Field of the Invention

The present invention relates to personal computer systems, and, more particularly, to personal computer system memories and methods of accessing personal computer system memories.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, notebooks and embedded systems. Personal computer (PC) systems, such as the International Business Machines (IBM) compatible PC systems, include desk top, floor standing, or portable versions. A typical PC system is a microcomputer that includes a microprocessor, associated memory and control logic (typically on a system board) and a number of peripheral devices that provide input and/or output (I/O) for the system. PC system boards often receive expansion PCBs to increase the capabilities of the computer system and to connect to peripheral devices through an expansion bus. For example, various multimedia devices are commonly implemented as add-in cards in desktop and portable computers or as integrated circuits for installation on a system board.

Computer systems typically include a set of built-in software routines called the basic input/output system (BIOS). The BIOS is a software interface between the system hardware and the operating system software. The BIOS facilitates programmer and user interaction with the system hardware. Because the BIOS has qualities of software and hardware, it is often referred to as firmware. Like software, the BIOS is a set of instructions to the computer's microprocessor. Like hardware, the BIOS is commonly coded onto a non-volatile memory such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS.

The BIOS controls several important functions of personal computer systems. For instance, the BIOS performs various functions at power up, including testing low memory, scanning for other BIOSs (e.g., peripheral BIOSs), yielding to other BIOSs when necessary, inventorying the system, and testing the system. The BIOS also controls keystroke interpretation, display of characters, and communication via the PC ports. The operating system and application programs of a computer system access the BIOS rather than directly manipulating I/O ports, registers and control words of the specific system hardware. BIOS is accessed through an interface of software interrupts and contains a plurality of entry points respectively corresponding to the different interrupts.

The BIOS memory (e.g., a PROM chip) typically has a significantly longer access time than standard DRAM (Dynamic RAM) or SRAM (Static RAM) used for PC main memories. DRAM chips with access times of about 70 ns and SRAM chips with access times below 25 ns are common. But EPROMs and other PROM types often need up to 200 ns before the addressed data is available. This is important because extensive BIOS routines for access to floppy and hard disk drives or the graphics adapters are often located in the slower PROM. Moreover, these routines are frequently called by the operating system or application programs, and thus slow down program execution.

To resolve this problem, the BIOS is commonly copied, or shadowed, from the slower BIOS memory into the faster RAM of main memory so that the main memory is now accessed instead of the BIOS memory. In some systems, BIOS shadowing is required because the BIOS is stored in a compressed format that must be decompressed for use. Accordingly, modern personal computer system designs utilize the BIOS memory only for limited functions, if at all, following the normal boot of the machine. Once the BIOS has been shadowed, the usage of the BIOS memory becomes infrequent.

SUMMARY

It has been discovered that a shared interface to a non-volatile memory including a first storage area for BIOS and a second storage area (e.g., for multimedia data), may be provided. Such an integrated configuration saves the cost and space of duplicating memory storage elements to support multiple data and program types in the PC. Additionally, such a configuration allows integration of such a secondary storage element upon personal computer system boards without a degradation in performance or an increase in pin count of the board memory because the same pins are used at different times for different memory portions. Accordingly, a storage system is provided to meet the demands of increasing storage requirements without a corresponding increase in cost, space or performance.

In one embodiment of the invention, a method of using a memory for storing BIOS information and application information includes: accessing BIOS information in a first memory via a first bus; shadowing the BIOS information from the first memory to a second memory; accessing the BIOS information in the second memory after shadowing the BIOS information; and accessing first application information in the first memory via the first bus after shadowing the BIOS information.

In another embodiment of the invention, an apparatus includes a first storage area storing BIOS information; a second storage area storing application information; and a common interface for accessing the first and second storage areas.

In another embodiment of the invention, a method of providing combined BIOS and application information storage includes: providing a non-volatile memory; storing BIOS information in the non-volatile memory, the BIOS information being accessible via a memory interface; and storing application information in the non-volatile memory, the application information being accessible via the memory interface.

BRIEF DESCRIPTION OF THE DRAWINGS

The present invention may be better understood, and its numerous objects, features, and advantages made apparent to those skilled in the art by referencing the accompanying figures.

DETAILED DESCRIPTION

The following sets forth a detailed description of the preferred embodiments of the invention. The description is intended to be illustrative of the invention and should not be taken to be limiting. Many variations, modifications, additions, and improvements may fall within the scope of the invention as defined in the claims that follow.

In one embodiment of the invention, a non-volatile storage element is provided to store system BIOS and multimedia data for wavetable synthesis functions. Once the BIOS is shadowed into faster RAM upon system power-up, the usage of the BIOS storage element becomes sufficiently infrequent to allow other applications of this storage element such as storing wavetable information.

Figure 1:
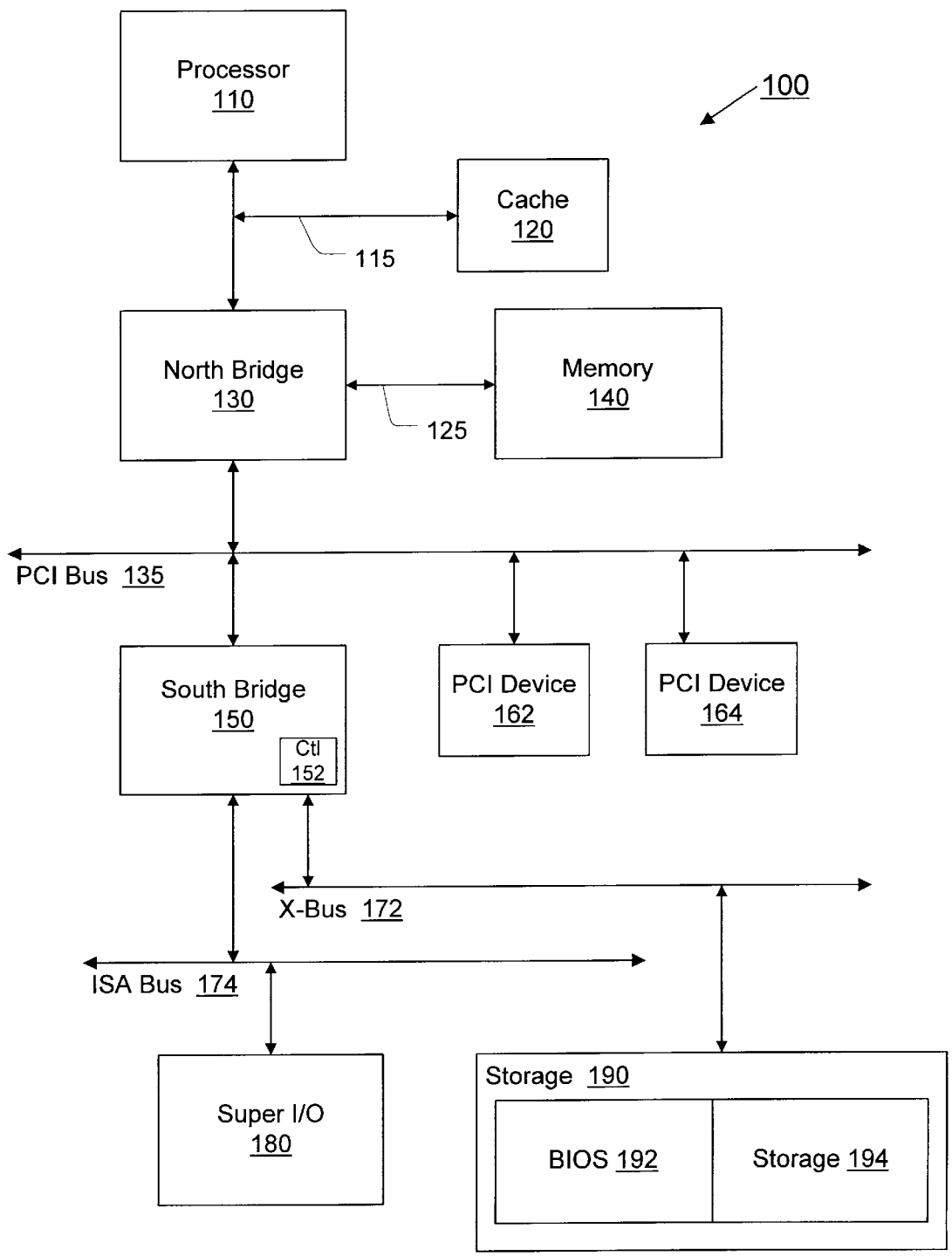
FIG. 1 shows a block diagram of a computer system according to an embodiment of the invention.

FIG. 1 depicts an exemplary computer system 100 according to an embodiment of the invention. Computer system 100 includes processor 110, cache 120, north bridge 130, memory 140, south bridge 150, PCdI devices 162, 164, super I/O chip 180 and combination memory 190. South Bridge 150 includes memory controller and interface 152. Combination memory 190 is a non-volatile memory which includes BIOS memory 192 and storage 194.

Processor 110 is coupled to cache 120 and north bridge 130 via local bus 115. North bridge 130 provides an interface between local bus 115 and Peripheral Component Interconnect (PCI) bus 135. PCI devices 162 and 164 are coupled to PCI bus 135. South bridge 150 provides an interface between PCI bus 135 and Industry Standard Architecture (ISA) bus 174. Super input/output (I/O) chip 180 is coupled to ISA bus 174. South bridge 150 also provides an interface to X-bus 172. Combination memory 190 is coupled to X-bus 172. BIOS memory 192 and storage 194 are accessed via controller 152 and X-bus 172.

North bridge 130 provides a communication link between the processor and memories of computer system 100 and the devices coupled to PCI bus 135 such as PCI devices 162, 164. Typically, PCI devices 162, 164 are integrated circuits on the system board of computer system 100, expansion components connected to PCI bus 135 via expansion slots, or some combination thereof.

South bridge 150 provides an interface between PCI bus 135 and various legacy devices such as a modem, a printer, a keyboard and/or mouse, or an electronic instrument through a Musical Instrument Digital Interface (MIDI). The South Bridge includes the logic necessary to interface the legacy devices to the rest of computer system 100 through X-bus 172 and/or ISA bus 174. The South Bridge includes memory and interface controller 152 to interface the BIOS memory to the rest of computer system 100 through X-bus 172.

In order to communicate with legacy devices which are designed to interface to the ISA bus, one approach, consistent with the trend towards increased integration in the PC, has been to provide a super I/O chip 180 rather than provide a number of discrete interfaces. Super I/O chip 180 provides I/O terminals and control logic for commonly used legacy peripheral devices such as keyboards, IDE (Intelligent Drive Electronics) drives, IEEE (Institute of Electrical and Electronic Engineers) parallel ports, serial communication ports. One example of such a super I/O chip is the National Semiconductor PC87306 SuperI/O chip ("SuperI/O" is a trademark of National Semiconductor Corporation of Santa Clara, Calif.). Thus, legacy devices can be included in the system by utilizing south bridge 150, ISA bus 174, and super I/O chip 180.

Exemplary personal computer system 100 includes a BIOS which is stored on BIOS memory 192 of combination memory 190. In the embodiment of FIG. 1, processor 110 and memory 140 communicate with the BIOS via north bridge 130, PCI bus 135, south bridge 150 and X-bus 172. Other embodiments may include any type of coupling between processor 110, memory 140 and BIOS 192, including any combination or exclusive use of buses and/or interface circuits. Furthermore, although X-bus 172 provides an avenue for accessing the combined memory 190 in the embodiment of FIG. 1, any type of bus or other storage coupling may be used.

Figure 2:
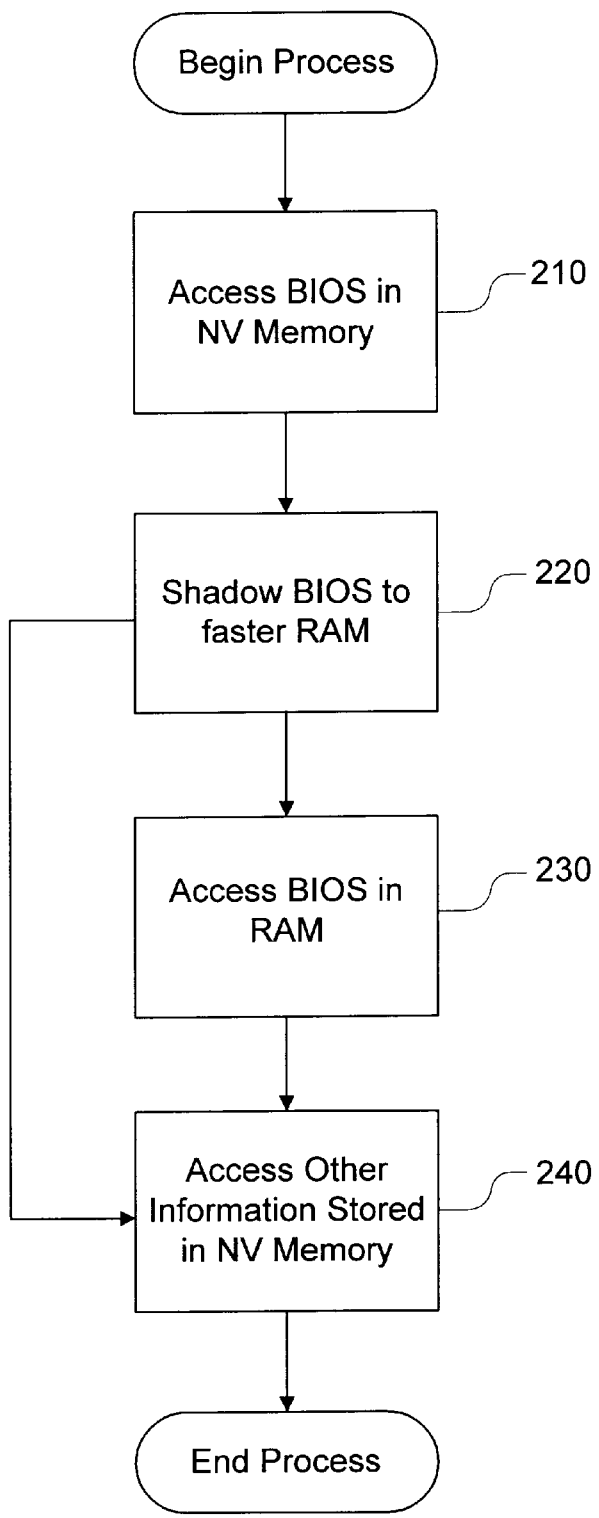
FIG. 2 shows a flow chart of a process according to an embodiment of the invention.

Referring to FIGS. 1 and 2, upon the initiation of operation of computer system 100, the BIOS is accessed for boot-up procedures at step 210. Control then transitions to step 220. During step 220, the BIOS code and data in BIOS memory 192 is copied, or shadowed, from the slower, non-volatile combination memory 190 into the faster RAM of main memory 140. To move the BIOS into the RAM, software transfers the data from combination memory 190 to the memory 140, and memory controller 152 maps the BIOS ROM address space onto the RAM area of memory 140 to which the ROM data have been moved. The former is carried out by the BIOS during the course of the boot process of the personal computer system. Processor 110 reads all of the data in BIOS memory 192, decompresses the data if necessary, and transfers the data into the RAM area of memory 140, which is then mapped onto the addresses of the original ROM address space by memory controller 152. The shadowed BIOS code and data are still located at the same physical address, but memory 140 is now accessed instead of BIOS memory 192, so no address alteration within the ROM code is required. Accordingly, BIOS memory 192 is masked off from the address space.

During step 230, after BIOS memory 192 is shadowed to memory 140, if an application such as a word processor attempts to access the hard disk via a BIOS interrupt to read data, processor 110 no longer addresses the code in BIOS memory 192. Instead, processor 110 addresses the code that has been transferred into the shadow RAM of memory 140. To avoid a computer crash during a BIOS call, all data is transferred from BIOS memory 192 to memory 140 because application programs and the system do not access BIOS memory 192. In one embodiment, BIOS memory 192 is not accessed unless a control bit is changed. Different chip sets may incorporate different access requirements.

Because computer system 100 utilizes BIOS memory 192 for limited functions, if at all, following the normal boot of the machine when the BIOS has been shadowed, the usage of X-bus 172 to access BIOS memory 192 becomes infrequent. For example, although the BIOS information may be accessed occasionally for plug and play technology, such use does not occur at the same time as other uses such as playing audio programs. Consequently, X-bus 172 can be used to access storage 194 for a variety of purposes with little or no performance cost during step 240.

Sufficient buffer elements, such as pipeline stages or FIFOs may be utilized to ensure that even the infrequent use of the BIOS image in combination memory 190 does not cause user perceived system performance or feature degradation. Additionally, such buffering can be used to enable other functions to share the interface to combination memory 190, such as a parallel port. In the embodiment of FIG. 1, such buffer circuitry is contained within and controlled by memory controller and interface 152.

In one embodiment, storage 194 is used to store information for multimedia applications. Specifically, storage 194 is used to store wavetable data for musical synthesis functions provided by an audio peripheral of computer system 100. Audio peripherals are commonly available as digital audio systems using a standard Musical Instrument Device Interface (MIDI) serial communication protocol for performance of audio voice signals. As noted, one type of audio peripheral is a wavetable-type music synthesizer that uses classic filter, amplifier, and modulation circuits to produce many various musical sounds. A wavetable device synthesizes musical signals from multiple oscillation signals that are stored in a memory, sampled, and synthesized in a plurality of waves in rapid succession. Two fundamental components of a wavetable audio synthesis device are a memory for storing wavetable data (e.g., multiple instrument waveforms) and musical signal processing circuits, including a digital signal processor.

The wavetable lookup methods of synthesis use looped samples of instruments to synthesize the musical notes. Wavetable synthesis generally offers higher quality of synthesis than other methods, such as the various frequency modulation methods, due to the more complex harmonic information contained in the wavetable instrument samples. This higher quality comes at an additional cost in the form of large amounts of ROM needed to store the library of wave-table loops and samples. A substantial amount of storage for the multiple instrument waveforms is required for a professional quality wavetable sound system.

Since wavetable and other multimedia data types usually have variable sizes including minimal sizes which provide a base-line capability and larger sizes which provide enhanced capabilities, this method supports a subset of data to be stored in the combination memory 190 while additional data can be held in other memory elements in computer system 100 such as memory 140. In such a system, for example, a minimal wavetable patch set could be provided from a non-volatile memory such as storage 194 while extended patch sets could be provided from memory 140 or other memories. The interface to combination memory 190 can contain both a memory mapping element to facilitate this split memory approach as well as intelligent data transport elements which could use such methods as direct memory access (DMA) to transparently acquire portions of the data from main memory.

In one embodiment, combination memory 190 is split between BIOS memory 192 and storage 194 in an equal ratio so that one bit selects between the BIOS information and the other storage information. Alternatively, other ratios may be used to divide combination memory 190 between BIOS memory 192 and storage 194.

Although storage 194 stores wavetable data for wavetable musical synthesis functions in the embodiment of FIG. 1, other embodiments may use storage 194 for storing modem code and/or DSP code, for example. Also, although storage 194 stores information from a single application in the embodiment of FIG. 1, storage 194 stores application information for multiple applications in other embodiments.

In one embodiment, combination memory 190 includes BIOS memory 192 and storage 194 in an integrated package. In one embodiment, combination memory 190 includes BIOS memory 192 and storage 194 in a multichip module. In another embodiment, BIOS memory 192 and storage 194 are separate packages accessible by a bus, coupling or other communication link to X-bus 172. Although X-bus 172 is used to access combination memory 190 in the embodiment of FIG. 1, other interfaces to combination memory 190 are used in other embodiments. Also, although controller 152 is shown in south bridge 150 in the embodiment of FIG. 1, other embodiments may include controller 152 in processor 110, for example.

While the invention has been described with reference to various embodiments, it will be understood that these embodiments are illustrative and that the scope of the invention is not limited to them. Many variations, modifications, additions, and improvements of the embodiments described may be implemented in agreement with the present invention. For example, many applications may use the storage supplied by the present invention. Furthermore, the storage techniques described herein are merely illustrative and a variety of additional and/or alternative techniques may be analogously provided in accordance with the present invention.

Furthermore, those skilled in the art will recognize that circuit elements in circuit diagrams and boundaries between logic blocks are merely illustrative and that alternative embodiments may merge logic blocks or circuit elements or impose an alternate decomposition of functionality upon various logic blocks or circuit elements. For example, although BIOS memory 192 and storage 194 are characterized as being within combination memory 190, such storage 194 may be represented separately from BIOS memory 192 or as part of the same storage logic block. For further example, although computer system 100 includes processor 110, cache 120 and memory 140 on the north bridge side of the PCI bus, other PC configurations will additionally and/or alternatively include other types of logic in accordance with the invention as claimed. Moreover, alternative embodiments may combine multiple instances of a particular component or combine multiple components into single components. These and other variations, modifications, additions, and improvements may fall within the scope of the invention as defined in the claims which follow.

What is claimed is:

1. A method of using a memory for storing BIOS information and application information, the method comprising:
    accessing BIOS information in a first memory via a first bus;
    shadowing the BIOS information from the first memory to a second memory;
    accessing the BIOS information in the second memory after shadowing the BIOS information; and
    accessing first application information in the first memory via the first bus after shadowing the BIOS information.

2. The method of claim 1 wherein the application information comprises multimedia information.

3. The method of claim 1 wherein the application information comprises wavetable synthesis data.

4. The method of claim 3 wherein
    the wavetable synthesis data comprises a minimal wavetable patch set; and
    extended wavetable patch sets are stored in a third memory.

5. The method of claim 4 wherein the second and third memory are the same memory.

6. The method of claim 1 further comprising:
    accessing second application information in the first memory via the first bus after shadowing the BIOS information.

7. The method of claim 1 wherein the first memory is a non-volatile memory, the method further comprising:
    buffering accessing of the first memory to lessen system performance degradation due to information being accessed over the first bus after shadowing the BIOS information.

8. The method of claim 7 wherein the buffering includes pipelining accesses to the first bus in a plurality of stages.

9. The method of claim 7 wherein the buffering includes using FIFOs to regulate access to the first bus.

10. The method of claim 1 wherein the accessing the first application information in the first memory comprises:

memory mapping to facilitate accessing of the first memory.

11. The method of claim 1 wherein the accessing the first application information in the first memory comprises:

direct memory accessing the first memory.

12. An apparatus comprising:

a first storage area on a first memory module storing BIOS information;

a second storage area on the first memory module storing application information;

a common interface for accessing the first and second storage areas; and a controller for shadowing the BIOS information to a second memory and for controlling accesses of the application information via the common interface.

13. The apparatus of claim 12 wherein the application information comprises multimedia information.

14. The apparatus of claim 12 wherein the application information comprises wavetable synthesis data.

15. The apparatus of claim 12 wherein the first and second storage areas are in a non-volatile memory.

16. The apparatus of claim 12 wherein the first and second storage areas are on a single semiconductor substrate.

17. The apparatus of claim 12 further comprising:

a processor; and a memory coupled to the processor; wherein the common interface is coupled to the processor and the memory.

18. The apparatus of claim 17 wherein the BIOS information is read from the first storage area and stored in the memory via the common interface responsive to the apparatus being powered on; and the second storage area is accessed by the processor via the common interface responsive to an application program instruction after the BIOS information is stored in the memory.

19. The apparatus of claim 17 wherein the processor includes the controller.

20. A method of providing combined BIOS and application information storage, the method comprising:

providing a non-volatile memory on a first semiconductor substrate;

storing BIOS information in the non-volatile memory, the BIOS information being accessible via a memory interface; and storing application information in the non-volatile memory, the application information being accessible via the memory interface.

21. The method of claim 20 further comprising:

providing a computer system including the non-volatile memory.

22. The method of claim 20 further comprising:

providing a printed circuit board including the non-volatile memory.

23. The method of claim 20 wherein the application information is wavetable synthesis information.

* * * * *